United States Patent
Cavaliere et al.

(10) Patent No.: US 10,009,138 B2
(45) Date of Patent: Jun. 26, 2018

(54) RADIO-OVER-FIBRE TRANSMISSION IN COMMUNICATIONS NETWORKS

(71) Applicant: Telefonaktiebolaget LM Ericsson (publ), Stockholm (SE)

(72) Inventors: Fabio Cavaliere, Pisa (IT); Luca Giorgi, Pisa (IT); Filippo Ponzini, Pisa (IT)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days. days.

(21) Appl. No.: 15/302,988

(22) PCT Filed: Apr. 10, 2014

(86) PCT No.: PCT/EP2014/057252
§ 371 (c)(1),
(2) Date: Oct. 8, 2016

(87) PCT Pub. No.: WO2015/154806
PCT Pub. Date: Oct. 15, 2015

(65) Prior Publication Data
US 2017/0033885 A1    Feb. 2, 2017

(51) Int. Cl.
*H04B 10/00* (2013.01)
*H04J 14/06* (2006.01)
(Continued)

(52) U.S. Cl.
CPC .......... *H04J 14/06* (2013.01); *H04B 10/2572* (2013.01); *H04B 10/2575* (2013.01); *H04B 10/25759* (2013.01); *H04B 10/588* (2013.01)

(58) Field of Classification Search
CPC ............ H04B 10/2572; H04B 10/2575; H04B 10/25759; H04B 10/588; H04J 14/06
(Continued)

(56) References Cited

U.S. PATENT DOCUMENTS

| | | | |
|---|---|---|---|
| 7,583,896 B2* | 9/2009 | Taniguchi | H04B 10/25753 398/115 |
| 8,027,589 B2* | 9/2011 | Song | H04B 10/25758 398/115 |

(Continued)

OTHER PUBLICATIONS

Ghafor et al; Sub-carrier-multiplexed duplex 64 QAM Radio-over-fiber transmission for distributed Antennas, Dec. 2011; IEEE; pp. 1368-1371.*

(Continued)

*Primary Examiner* — Amritbir Sandhu
(74) *Attorney, Agent, or Firm* — Leffler Intellectual Property Law, PLLC

(57) ABSTRACT

A radio-over-fibre transmitter comprising: an optical splitter arranged to receive an optical carrier signal having a carrier optical frequency, and split it into a plurality of portions; electro-optic modulation apparatus each arranged to receive a respective optical carrier signal portion and a respective modulated radio frequency subcarrier signal, and arranged to modulate the respective optical carrier signal portion with the respective modulated radio frequency subcarrier signal and arranged to suppress onward transmission of the respective optical carrier signal portion, to form a respective carrier suppressed optical subcarrier signal; an optical combiner arranged to receive the carrier suppressed optical subcarrier signals and one of the optical carrier signal portions and arranged to combine them to form a subcarrier multiplexed optical signal; and polarisation apparatus arranged to ensure that the carrier suppressed optical subcarrier signals and said optical carrier signal portion each have the same polarisation state at the optical combiner.

15 Claims, 14 Drawing Sheets

(51) Int. Cl.
*H04B 10/2575* (2013.01)
*H04B 10/2507* (2013.01)
*H04B 10/588* (2013.01)

(58) Field of Classification Search
USPC .............................................. 398/65, 76, 115
See application file for complete search history.

(56) References Cited

U.S. PATENT DOCUMENTS

| | | | | |
|---|---|---|---|---|
| 8,873,585 | B2* | 10/2014 | Oren | H04B 7/022 370/334 |
| 9,219,546 | B2* | 12/2015 | George | H04B 10/25759 |
| 9,525,472 | B2* | 12/2016 | George | H04B 7/0469 |
| 9,729,267 | B2* | 8/2017 | Rosenfelder | H04J 14/0282 |
| 2002/0012495 | A1* | 1/2002 | Sasai | H04B 10/25753 385/24 |
| 2005/0271387 | A1* | 12/2005 | Kee | H04B 10/2543 398/140 |
| 2005/0286908 | A1* | 12/2005 | Way | H04B 10/2575 398/186 |
| 2008/0044186 | A1* | 2/2008 | George | H04B 10/25754 398/115 |
| 2010/0142955 | A1* | 6/2010 | Yu | H04B 10/25754 398/72 |
| 2010/0178057 | A1* | 7/2010 | Shieh | H04L 25/0224 398/79 |
| 2013/0051803 | A1* | 2/2013 | Kato | H04J 14/02 398/79 |
| 2013/0088765 | A1* | 4/2013 | Duthel | H04B 10/506 359/259 |
| 2014/0147119 | A1* | 5/2014 | Watanabe | H04B 10/5051 398/76 |
| 2014/0294393 | A1* | 10/2014 | Lowery | H04B 10/548 398/76 |
| 2014/0363164 | A1* | 12/2014 | Kim | H04J 14/06 398/65 |
| 2017/0033885 | A1* | 2/2017 | Cavaliere | H04B 10/25759 |
| 2017/0104536 | A1* | 4/2017 | Testa | H04B 10/2569 |
| 2017/0126319 | A1* | 5/2017 | Cavaliere | H04B 10/2575 |
| 2017/0149509 | A1* | 5/2017 | Urban | H04B 10/5165 |
| 2017/0214151 | A1* | 7/2017 | Kanesan | H01Q 21/24 |

OTHER PUBLICATIONS

Mehmood et al; Polarization multiplexing-based duplex radio-over-fiber link for millimeter wave signal trasnmission to a ring of multiple radio access units, Aug. 2017; pp. 1-8.*

Ghafoor et al; sub-carrier-multiplexed duplex 64-QAM Radio-over-fiber Transmission for distributed antennnas; Dec. 2011; IEEE; pp. 1368-1371.*

Mehmood et al; Polarization multiplexing based duplex radio-over-fiber link for millimeter wave signal transmission to a ring of multiple radio access units; 2017; pp. 1-8.*

Zhang et al; Experimental demonstration of 24-Gb/s CAP-64QAM radio-over-fiber system over 40-GHZ mm-wave fiber-wireless transmission; Oct. 2013; OSA; pp. 26888-26895.*

PCT International Search Report, dated Feb. 25, 2015, in connection with International Application No. PCT/EP2014/057252, all pages.

Toshiaki Kuri et al., Optical Heterodyne Detection Technique for Densely Multiplexed Millimeter-Wave-Band Radio-on-Fiber Systems, Journal of Lightwave Technology, vol. 21, No. 12, Dec. 2003, 13 pages.

Ana Ferreira et al., External modulator linearization techniques for high performance radio over fiber transmission systems, Transparent Optical Netowrks, 2009, ICTON 2009, 11th International Conference, IEEE Piscataway, NJ, USA, Jun. 28, 2009, pp. 1-4.

Christina Lim et al., Investigation of Intermodulation Distortion Reduction Technique for Milti-Channel Fiber-Radio Transmission in Heterogeneous Access Networks, Lasers & Electro-Optics Society, IEEE, Oct. 1, 2006, pp. 264-265.

Christina Lim et al., Fiber-Wireless Networks and Subsystem Technologies, Journal of Lightwave Technology, vol. 28, No. 4, Feb. 15, 2010, pp. 390-405.

Teddy Kurniawan et al., Performance Analysis of Optimized Millimeter-Wave Fiber Radio Links, IEEE Transactions on Microwave Theory and Techniques, vol. 54, No. 2, Feb. 2006, pp. 921-928.

K.J. Williams et al., Stimulated Brillouin scattering for improvement of microwave fibre-optic link efficiency, Electronics Letters, Nov. 10, 1994, vol. 30, No. 23, pp. 1965-1966.

S. Tonda-Goldstein et al., Stimulated Brillouin scattering for microwave signal modulation depth increase in optical links, Electronics Letters, May 25, 2000, vol. 36, No. 11, pp. 944-946.

M.J. Lagasse et al., Optical carrier filtering for high dynamic range fibre optic links, Electronics Letters, Dec. 8, 1994, vol. 30 No. 25, pp. 2157-2158.

R.D. Esman et al., Wideband Efficiency Improvement of Fiber Optic Systems by Carrier Subtraction, IEEE Photonics Technology Letters, vol. 7, No. 2, Feb. 1995, pp. 218-220.

Hiroyuki Toda et al., 25-GHZ Channel Spacing DWDM Multiplexing Using an Arrayed Waveguide Grating for 60-GHZ Band Radio-on-Fiber Systems, International Topical Meeting on Microwave Photonics, Sep. 10-12, 2003, pp. 287-290.

PCT Written Opinion, dated Feb. 25, 2015, in connection with International Application No. PCT/EP2014/057252, all pages.

* cited by examiner

RADIO-OVER-FIBRE TRANSMISSION IN COMMUNICATIONS NETWORKS

TECHNICAL FIELD

The invention relates to a radio-over-fibre transmitter and a communications network base station node comprising the radio-over-fibre transmitter. The invention further relates to a communications network base station system comprising the communications network base station node and to a communications network comprising the communications network base station node. The invention further relates to a method of transmitting radio frequency communications signals over an optical fibre.

BACKGROUND

Radio-over-fibre, RoF, technology is a promising solution where an optical network is used to federate several radio antennas in a communications network, making use of the large bandwidth offered by the optical fibre and its low loss. RoF is a technique that modulates radio frequency, RF, signals on optical signals for transmission over optical fibre. RoF technology is being considered for use in future generations of wireless radio communication systems to provide high quality broadband service to high density and mobile users. RoF is currently most widely used in the digital domain, particularly for the common public radio interface, CPRI. By using RoF it is possible to simplify the transceivers between fibre and radio and as a result significantly reduce costs.

Within an optical fibre point-to-point link connecting an antenna base station to a central office, the received RF wireless signals must undergo electrical-to-optical conversion, typically by direct modulation of a laser or through external modulation using an electro-optic modulator in conjunction with an optical carrier signal. In a technique known as subcarrier multiplexing, SCM, a plurality of RF signals are multiplexed and then modulated onto an optical carrier. Due to the nonlinear characteristic of electro-optic modulators, RF signals are typically weakly modulated onto the optical carrier, resulting in very low modulation efficiency. Consequently the power of the optically modulated RF signal can be more than 20 dB below that of the optical carrier. In addition, the nonlinear characteristics of the electro-optical modulator results in the generation of intermodulation products between the RF signals and the optical carrier, and between the optical subcarriers, which can cause further signal degradation.

In wireless communications network fronthaul, which connects radio equipment to radio equipment controllers, digital RoF techniques are mostly used, but analogue RoF techniques bring the advantage of lower latency and lower power consumption. As a drawback, in RoF, the overall system performance is limited by the performance of the optical subsystem blocks, primarily due to the nonlinear transfer function of the electro-optical modulator used to modulate each SCM signal onto its optical carrier signal. To improve the modulation efficiency, the optical power of the optical carrier signals can be increased by using a high power optical source or an optical amplifier. However, this may lead to increased intermodulation distortions at the receiver or even receiver damage due to the high optical power incident on the optical detector. Also, optical amplification increases the costs, and it is usually not acceptable for RoF applications.

Various analogue RoF techniques have been proposed including Brillouin scattering, external optical filtering, and optical attenuation but all of these techniques suffer intermodulation distortions, which are a particular problem for SCM RF signals. To reduce intermodulation distortion between the RF signals and the optical carrier, carrier suppressed modulation techniques may be used, as reported in C. Lim et al, "Investigation of Intermodulation Distortion Reduction Technique for Multi-Channel Fiber-Radio Transmission in Heterogeneous Access Networks", Proc. LEOS 2006, but this approach does not mitigate the effect of intermodulation products between the optical subcarriers.

SUMMARY

It is an object to provide an improved radio-over-fibre transmitter. It is a further object to provide an improved communications network base station node. It is a further object to provide an improved communications network base station system. It is a further object to provide an improved communications network. It is a further object to provide an improved method of transmitting radio frequency communications signals over an optical fibre.

A first aspect of the invention provides a radio-over-fibre transmitter comprising an optical splitter, a plurality of electro-optic modulation apparatus, an optical combiner and polarisation apparatus. The optical splitter is arranged to receive an optical carrier signal having a carrier optical frequency and is arranged to split the optical carrier signal into a plurality of optical carrier signal portions. Each of the electro-optic modulation apparatus is arranged to receive a respective one of the optical carrier signal portions and a respective one of a plurality of modulated radio frequency subcarrier signals. Each electro-optic modulation apparatus is arranged to modulate the respective optical carrier signal portion with the respective modulated radio frequency subcarrier signal. Each electro-optic modulation apparatus is also arranged to suppress onward transmission of the respective optical carrier signal portion. Each electro-optic modulation apparatus thereby forms a respective carrier suppressed optical subcarrier signal at a respective optical frequency, different to the carrier optical frequency. The optical combiner is arranged to receive the carrier suppressed optical subcarrier signals and one of the optical carrier signal portions. The optical combiner is arranged to combine said carrier suppressed optical subcarrier signals and the said one of the optical carrier signal portions to form a subcarrier multiplexed optical signal. The polarisation apparatus is arranged to ensure that the carrier suppressed optical subcarrier signals and the said one of the optical carrier signal portions each have the same polarisation state at the optical combiner.

This radio-over-fibre transmitter may enable a plurality of modulated radio frequency subcarrier signals to be carried on a single optical carrier signal without any intermodulation products being generated both between the radio frequency signal and the optical carrier and between the subcarriers. This may therefore enable a higher number of modulated radio frequency subcarrier signals to be carried on a single optical carrier signal than is possible using the prior art techniques discussed above. This radio-over-fibre transmitter may offer lower latency and power consumption than prior art digital RoF techniques. This radio-over-fibre transmitter may offer higher optical modulation efficiency than is possible when multiplexed RF signals are modulated onto an optical carrier.

In an embodiment, the radio-over-fibre transmitter further comprises an optical attenuator provided between the optical splitter and the optical combiner. The optical attenuator is arranged to apply an attenuation to the said one of the optical carrier signal portions. This may enable the optical signal power ratio between the said one of the optical carrier signal portions (in prior art terms the 'optical carrier') and the carrier suppressed optical subcarrier signals (the 'subcarriers') to be adjusted, which may enable transmission performance at an optical receiver arranged to receive the subcarrier multiplexed optical signal to be increased. In conventional subcarrier multiplexing techniques it is not possible to finely optimize this ratio.

In an embodiment, the optical attenuator is a variable optical attenuator. This may enable variable control of the optical power of the said one of the optical carrier signals and therefore variable control of the optical signal power ratio between the said one of the optical carrier signal portions and the carrier suppressed optical subcarrier signals.

In an embodiment, the polarisation apparatus comprises the optical splitter, which is a polarisation maintaining optical splitter, the electro-optic modulation apparatus, each of which is polarisation maintaining, and a plurality of polarisation maintaining optical waveguides. Each waveguide is arranged to couple the optical splitter to the electro-optic modulation apparatus and to couple the electro-optic modulation apparatus to the optical combiner. This may ensure polarisation alignment between the said one of the optical carrier signals and the carrier suppressed optical subcarrier signals prior to combination, which may ensure correct detection of the subcarrier multiplexed optical signal.

In an embodiment, the polarisation apparatus comprises a plurality of polarisation controllers. A respective polarisation controller is provided between each electro-optic modulation apparatus and the optical combiner and between the optical splitter and the optical combiner.

In an embodiment, the radio-over-fibre transmitter further comprises a plurality of electrical modulators. Each electrical modulator is arranged to receive a respective one of a plurality of radio frequency communications signals and a respective radio frequency subcarrier signal; each radio frequency subcarrier signal has a different frequency. Each electrical modulator is arranged to modulate the respective radio frequency subcarrier signal with the respective radio frequency communications signal to form a respective one of the modulated radio frequency subcarrier signals. The modulated radio frequency subcarrier signals may therefore be locally generated at the RoF transmitter.

In an embodiment, each electrical modulator is an electrical mixer. This may provide a simple and cost effective arrangement for generating the modulated radio frequency subcarrier signals.

In an embodiment, the radio-over-fibre transmitter further comprises an optical source arranged to generate the optical carrier signal. This may enable the optical carrier signal to be locally generated and the optical power and wavelength of the optical carrier signal to be locally set.

In an embodiment, the optical combiner is an optical beam collimator. Use of an optical beam collimator may enable the said one of the optical carrier signals and the carrier suppressed optical subcarrier signals to be collimated into a single output optical waveguide, thereby avoiding output coupling losses.

In an embodiment, the radio frequency subcarrier signal frequencies are selected so that optical subcarrier signal spectra do not overlap. This may ensure that the optical collimator does not combine two carrier suppressed optical subcarrier signals of same optical frequency but different phase, which would cause constructive or destructive interference to occur.

In an embodiment, the radio frequency subcarrier signal frequencies have a frequency spacing of at least 20 MHz. In an embodiment, the radio frequency subcarrier signal frequencies have a frequency spacing in the range 20 MHz to 40 MHz.

In an embodiment, each electro-optic modulation apparatus is an electro-optic modulator having a transfer function having a minimum transmission point. Each electro-optic modulator is biased so that the minimum transmission point is at the optical frequency of the optical carrier signal. This enables the electro-optic modulators to suppress transmission of the respective optical carrier signal portions.

In an embodiment, each electro-optic modulation apparatus comprises an electro-optic modulator and an optical filter. The optical filter is arranged to suppress transmission of the respective optical carrier signal portion. This enables the electro-optic modulation apparatus to suppress transmission of the respective optical carrier signal portions.

In an embodiment, the optical splitter is separated from the optical combiner by a first optical path length, the optical splitter is separated from each of the plurality of electro-optic modulation apparatus by a respective second optical path length and the plurality of electro-optic modulation apparatus are separated from the optical combiner by a third optical path length. The said one of the optical carrier signal portions is transmitted across a first total optical path length from the optical splitter to the optical combiner and each of the carrier suppressed optical subcarrier signals is transmitted across a respective second total optical path length from the optical splitter to the optical combiner. The first, second and third optical path lengths are selected such that a difference between the first total optical path length and the respective second total optical path lengths is less than a preselected maximum path length difference. This may ensure that any noise generated by the phase mismatch resulting from the path length difference between the optical carrier and the subcarriers can be compensated for at a receiver apparatus using electronic digital signal processing.

In an embodiment, the radio-over-fibre transmitter is a photonic integrated structure. Photonic integration may enable the RoF transmitter to be produced on a single chip and may ensure proper polarisation alignment of the said one of the optical carrier signals and the carrier suppressed optical subcarrier signals.

A second aspect of the invention provides a communications network base station node comprising a radio-over-fibre transmitter. The radio-over-fibre transmitter comprises an optical splitter, a plurality of electro-optic modulation apparatus, an optical combiner and polarisation apparatus. The optical splitter is arranged to receive an optical carrier signal having a carrier optical frequency and is arranged to split the optical carrier signal into a plurality of optical carrier signal portions. Each of the electro-optic modulation apparatus is arranged to receive a respective one of the optical carrier signal portions and a respective one of a plurality of modulated radio frequency subcarrier signals. Each electro-optic modulation apparatus is arranged to modulate the respective optical carrier signal portion with the respective modulated radio frequency subcarrier signal. Each electro-optic modulation apparatus is also arranged to suppress onward transmission of the respective optical carrier signal portion. Each electro-optic modulation apparatus thereby forms a respective carrier suppressed optical subcarrier signal at a respective optical frequency, different to the carrier optical frequency. The optical combiner is arranged to receive the carrier suppressed optical subcarrier signals and one of the optical carrier signal portions. The optical combiner is arranged to combine said carrier suppressed optical subcarrier signals and the said one of the optical carrier signal portions to form a subcarrier multiplexed optical signal. The polarisation apparatus is arranged to ensure that the carrier suppressed optical subcarrier signals and the said one of the optical carrier signal portions each have the same polarisation state at the optical combiner.

This radio-over-fibre transmitter may enable a plurality of modulated radio frequency subcarrier signals to be carried on a single optical carrier signal without any intermodulation products being generated both between the radio frequency signal and the optical carrier and between the subcarriers. This may therefore enable the communications network base station node to transmit a higher number of modulated radio frequency subcarrier signals carried on a single optical carrier signal than is possible using the prior art techniques discussed above. This radio-over-fibre transmitter may enable the base station node to operate with lower latency and power consumption than those using prior art digital RoF techniques. This radio-over-fibre transmitter may offer higher optical modulation efficiency than is possible when multiplexed RF signals are modulated onto an optical carrier, which may enable the base station node to operate with an increased power budget.

In an embodiment, the radio-over-fibre transmitter further comprises an optical attenuator provided between the optical splitter and the optical combiner. The optical attenuator is arranged to apply an attenuation to the said one of the optical carrier signal portions. This may enable the optical signal power ratio between the said one of the optical carrier signal portions (in prior art terms the 'optical carrier') and the carrier suppressed optical subcarrier signals (the 'subcarriers') to be adjusted, which may enable transmission performance at an optical receiver arranged to receive the subcarrier multiplexed optical signal to be increased. In conventional subcarrier multiplexing techniques it is not possible to finely optimize this ratio.

In an embodiment, the optical attenuator is a variable optical attenuator. This may enable variable control of the optical power of the said one of the optical carrier signals and therefore variable control of the optical signal power ratio between the said one of the optical carrier signal portions and the carrier suppressed optical subcarrier signals.

In an embodiment, the polarisation apparatus comprises the optical splitter, which is a polarisation maintaining optical splitter, the electro-optic modulation apparatus, each of which is polarisation maintaining, and a plurality of polarisation maintaining optical waveguides. Each waveguide is arranged to couple the optical splitter to the electro-optic modulation apparatus and to couple the electro-optic modulation apparatus to the optical combiner. This may ensure polarisation alignment between the said one of the optical carrier signals and the carrier suppressed optical subcarrier signals prior to combination, which may ensure correct detection of the subcarrier multiplexed optical signal.

In an embodiment, the polarisation apparatus comprises a plurality of polarisation controllers. A respective polarisation controller is provided between each electro-optic modulation apparatus and the optical combiner and between the optical splitter and the optical combiner.

In an embodiment, the radio-over-fibre transmitter further comprises a plurality of electrical modulators. Each electrical modulator is arranged to receive a respective one of a plurality of radio frequency communications signals and a respective radio frequency subcarrier signal; each radio frequency subcarrier signal has a different frequency. Each electrical modulator is arranged to modulate the respective radio frequency subcarrier signal with the respective radio frequency communications signal to form a respective one of the modulated radio frequency subcarrier signals. The modulated radio frequency subcarrier signals may therefore be locally generated at the RoF transmitter.

In an embodiment, each electrical modulator is an electrical mixer. This may provide a simple and cost effective arrangement for generating the modulated radio frequency subcarrier signals.

In an embodiment, the radio-over-fibre transmitter further comprises an optical source arranged to generate the optical carrier signal. This may enable the optical carrier signal to be locally generated and the optical power and wavelength of the optical carrier signal to be locally set.

In an embodiment, the optical combiner is an optical beam collimator. Use of an optical beam collimator may enable the said one of the optical carrier signals and the carrier suppressed optical subcarrier signals to be collimated into a single output optical waveguide, thereby avoiding output coupling losses.

In an embodiment, the radio frequency subcarrier signal frequencies are selected so that optical subcarrier signal spectra do not overlap. This may ensure that the optical collimator does not combine two carrier suppressed optical subcarrier signals of same optical frequency but different phase, which would cause constructive or destructive interference to occur.

In an embodiment, the radio frequency subcarrier signal frequencies have a frequency spacing of at least 20 MHz. In an embodiment, the radio frequency subcarrier signal frequencies have a frequency spacing in the range 20 MHz to 40 MHz.

In an embodiment, each electro-optic modulation apparatus is an electro-optic modulator having a transfer function having a minimum transmission point. Each electro-optic modulator is biased so that the minimum transmission point is at the optical frequency of the optical carrier signal. This enables the electro-optic modulators to suppress transmission of the respective optical carrier signal portions.

In an embodiment, each electro-optic modulation apparatus comprises an electro-optic modulator and an optical filter. The optical filter is arranged to suppress transmission of the respective optical carrier signal portion. This enables the electro-optic modulation apparatus to suppress transmission of the respective optical carrier signal portions.

In an embodiment, the optical splitter is separated from the optical combiner by a first optical path length, the optical splitter is separated from each of the plurality of electro-optic modulation apparatus by a respective second optical path length and the plurality of electro-optic modulation apparatus are separated from the optical combiner by a third optical path length. The said one of the optical carrier signal portions is transmitted across a first total optical path length from the optical splitter to the optical combiner and each of the carrier suppressed optical subcarrier signals is transmitted across a respective second total optical path length from the optical splitter to the optical combiner. The first, second and third optical path lengths are selected such that a difference between the first total optical path length and the respective second total optical path lengths is less than a preselected maximum path length difference. This may ensure that any noise generated by the phase mismatch resulting from the path length difference between the optical carrier and the subcarriers can be compensated for at a receiver apparatus using electronic digital signal processing.

In an embodiment, the radio-over-fibre transmitter is a photonic integrated structure. Photonic integration may enable the RoF transmitter to be produced on a single chip and may ensure proper polarisation alignment of the said one of the optical carrier signals and the carrier suppressed optical subcarrier signals.

A third aspect of the invention provides a communications network base station system comprising a first base station node, a second base station node and an optical fibre. Each of the first base station node and the second base station node comprise a respective radio-over-fibre transmitter. Each radio-over-fibre transmitter comprises an optical splitter, a plurality of electro-optic modulation apparatus, an optical combiner and polarisation apparatus. The optical splitter is arranged to receive an optical carrier signal having a carrier optical frequency and is arranged to split the optical carrier signal into a plurality of optical carrier signal portions. Each of the electro-optic modulation apparatus is arranged to receive a respective one of the optical carrier signal portions and a respective one of a plurality of modulated radio frequency subcarrier signals. Each electro-optic modulation apparatus is arranged to modulate the respective optical carrier signal portion with the respective modulated radio frequency subcarrier signal. Each electro-optic modulation apparatus is also arranged to suppress onward transmission of the respective optical carrier signal portion. Each electro-optic modulation apparatus thereby forms a respective carrier suppressed optical subcarrier signal at a respective optical frequency, different to the carrier optical frequency. The optical combiner is arranged to receive the carrier suppressed optical subcarrier signals and one of the optical carrier signal portions. The optical combiner is arranged to combine said carrier suppressed optical subcarrier signals and the said one of the optical carrier signal portions to form a subcarrier multiplexed optical signal. The polarisation apparatus is arranged to ensure that the carrier suppressed optical subcarrier signals and the said one of the optical carrier signal portions each have the same polarisation state at the optical combiner. The optical fibre is coupled between the first base station node and the second base station node.

This radio-over-fibre transmitter may enable a plurality of modulated radio frequency subcarrier signals to be carried on a single optical carrier signal without any intermodulation products being generated both between the radio frequency signal and the optical carrier and between the subcarriers. This may therefore enable each communications network base station node to transmit a higher number of modulated radio frequency subcarrier signals carried on a single optical carrier signal than is possible using the prior art techniques discussed above. This radio-over-fibre transmitter may enable the communications network base station system to operate with lower latency and power consumption than those using prior art digital RoF techniques. This radio-over-fibre transmitter may offer higher optical modulation efficiency than is possible when multiplexed RF signals are modulated onto an optical carrier, which may enable the base station system to operate with an increased power budget.

In an embodiment, the radio-over-fibre transmitter further comprises an optical attenuator provided between the optical splitter and the optical combiner. The optical attenuator is arranged to apply an attenuation to the said one of the optical carrier signal portions. This may enable the optical signal power ratio between the said one of the optical carrier signal portions (in prior art terms the 'optical carrier') and the carrier suppressed optical subcarrier signals (the 'subcarriers') to be adjusted, which may enable transmission performance at an optical receiver arranged to receive the subcarrier multiplexed optical signal to be increased. In conventional subcarrier multiplexing techniques it is not possible to finely optimize this ratio.

In an embodiment, the optical attenuator is a variable optical attenuator. This may enable variable control of the optical power of the said one of the optical carrier signals and therefore variable control of the optical signal power ratio between the said one of the optical carrier signal portions and the carrier suppressed optical subcarrier signals.

In an embodiment, the polarisation apparatus comprises the optical splitter, which is a polarisation maintaining optical splitter, the electro-optic modulation apparatus, each of which is polarisation maintaining, and a plurality of polarisation maintaining optical waveguides. Each waveguide is arranged to couple the optical splitter to the electro-optic modulation apparatus and to couple the electro-optic modulation apparatus to the optical combiner. This may ensure polarisation alignment between the said one of the optical carrier signals and the carrier suppressed optical subcarrier signals prior to combination, which may ensure correct detection of the subcarrier multiplexed optical signal.

In an embodiment, the polarisation apparatus comprises a plurality of polarisation controllers. A respective polarisation controller is provided between each electro-optic modulation apparatus and the optical combiner and between the optical splitter and the optical combiner.

In an embodiment, the radio-over-fibre transmitter of the second base station node further comprises a plurality of electrical modulators. Each electrical modulator is arranged to receive a respective one of the plurality of radio frequency communications signals and a respective radio frequency subcarrier signal; each radio frequency subcarrier signal has a different frequency. Each electrical modulator is arranged to modulate the respective radio frequency subcarrier signal with the respective radio frequency communications signal to form a respective one of the modulated radio frequency subcarrier signals. The modulated radio frequency subcarrier signals may therefore be locally generated at the RoF transmitter.

In an embodiment, each electrical modulator is an electrical mixer. This may provide a simple and cost effective arrangement for generating the modulated radio frequency subcarrier signals.

In an embodiment, the radio-over-fibre transmitter further comprises an optical source arranged to generate the optical carrier signal. This may enable the optical carrier signal to be locally generated and the optical power and wavelength of the optical carrier signal to be locally set.

In an embodiment, the optical combiner is an optical beam collimator. Use of an optical beam collimator may enable the said one of the optical carrier signals and the carrier suppressed optical subcarrier signals to be collimated into a single output optical waveguide, thereby avoiding output coupling losses.

In an embodiment, the radio frequency subcarrier signal frequencies are selected so that optical subcarrier signal spectra do not overlap. This may ensure that the optical collimator does not combine two carrier suppressed optical subcarrier signals of same optical frequency but different phase, which would cause constructive or destructive interference to occur.

In an embodiment, the radio frequency subcarrier signal frequencies have a frequency spacing of at least 20 MHz. In an embodiment, the radio frequency subcarrier signal frequencies have a frequency spacing in the range 20 MHz to 40 MHz.

In an embodiment, each electro-optic modulation apparatus is an electro-optic modulator having a transfer function having a minimum transmission point. Each electro-optic modulator is biased so that the minimum transmission point is at the optical frequency of the optical carrier signal. This enables the electro-optic modulators to suppress transmission of the respective optical carrier signal portions.

In an embodiment, each electro-optic modulation apparatus comprises an electro-optic modulator and an optical filter. The optical filter is arranged to suppress transmission of the respective optical carrier signal portion. This enables the electro-optic modulation apparatus to suppress transmission of the respective optical carrier signal portions.

In an embodiment, the optical splitter is separated from the optical combiner by a first optical path length, the optical splitter is separated from each of the plurality of electro-optic modulation apparatus by a respective second optical path length and the plurality of electro-optic modulation apparatus are separated from the optical combiner by a third optical path length. The said one of the optical carrier signal portions is transmitted across a first total optical path length from the optical splitter to the optical combiner and each of the carrier suppressed optical subcarrier signals is transmitted across a respective second total optical path length from the optical splitter to the optical combiner. The first, second and third optical path lengths are selected such that a difference between the first total optical path length and the respective second total optical path lengths is less than a preselected maximum path length difference. This may ensure that any noise generated by the phase mismatch resulting from the path length difference between the optical carrier and the subcarriers can be compensated for at a receiver apparatus using electronic digital signal processing.

In an embodiment, the radio-over-fibre transmitter is a photonic integrated structure. Photonic integration may enable the RoF transmitter to be produced on a single chip and may ensure proper polarisation alignment of the said one of the optical carrier signals and the carrier suppressed optical subcarrier signals.

A fourth aspect of the invention provides a communications network comprising a first base station node, a second base station node, a plurality of radio antennas and an optical fibre. Each of the radio antennas is arranged to transmit a respective radio frequency communications signal. The optical fibre is coupled between the first base station node and the second base station node. Each of the first base station node and the second base station node comprises a radio-over-fibre transmitter comprising an optical splitter, a plurality of electro-optic modulation apparatus, an optical combiner and polarisation apparatus. The optical splitter is arranged to receive an optical carrier signal having a carrier optical frequency and is arranged to split the optical carrier signal into a plurality of optical carrier signal portions. Each of the electro-optic modulation apparatus is arranged to receive a respective one of the optical carrier signal portions and a respective one of a plurality of modulated radio frequency subcarrier signals. Each electro-optic modulation apparatus is arranged to modulate the respective optical carrier signal portion with the respective modulated radio frequency subcarrier signal. Each electro-optic modulation apparatus is also arranged to suppress onward transmission of the respective optical carrier signal portion. Each electro-optic modulation apparatus thereby forms a respective carrier suppressed optical subcarrier signal at a respective optical frequency, different to the carrier optical frequency. The optical combiner is arranged to receive the carrier suppressed optical subcarrier signals and one of the optical carrier signal portions. The optical combiner is arranged to combine said carrier suppressed optical subcarrier signals and the said one of the optical carrier signal portions to form a subcarrier multiplexed optical signal. The polarisation apparatus is arranged to ensure that the carrier suppressed optical subcarrier signals and the said one of the optical carrier signal portions each have the same polarisation state at the optical combiner. The radio-over-fibre transmitter of the second base station node additionally comprises a plurality of electrical modulators. Each electrical modulator is arranged to receive a respective one of the radio frequency communications signals transmitted by the radio antennas and a respective radio frequency subcarrier signal; each radio frequency subcarrier signal has a different frequency. Each electrical modulator is arranged to modulate the respective radio frequency subcarrier signal with the respective radio frequency communications signal to form a respective one of the modulated radio frequency subcarrier signals.

This radio-over-fibre transmitter may enable a plurality of modulated radio frequency subcarrier signals to be carried on a single optical carrier signal without any intermodulation products being generated both between the radio frequency signal and the optical carrier and between the subcarriers. This may therefore enable each base station node to transmit a higher number of modulated radio frequency subcarrier signals carried on a single optical carrier signal than is possible using the prior art techniques discussed above. This radio-over-fibre transmitter may enable each base station node to operate with lower latency and power consumption than those using prior art digital RoF techniques. This radio-over-fibre transmitter may offer higher optical modulation efficiency than is possible when multiplexed RF signals are modulated onto an optical carrier, which may enable the communications network to operate with an increased power budget.

In an embodiment, each radio-over-fibre transmitter further comprises an optical attenuator provided between the optical splitter and the optical combiner. Each optical attenuator is arranged to apply an attenuation to the said one of the optical carrier signal portions. This may enable the optical signal power ratio between the said one of the optical carrier signal portions (in prior art terms the 'optical carrier') and the carrier suppressed optical subcarrier signals (the 'subcarriers') to be adjusted, which may enable transmission performance at an optical receiver arranged to receive a respective one of the subcarrier multiplexed optical signals to be increased. In conventional subcarrier multiplexing techniques it is not possible to finely optimize this ratio.

In an embodiment, each optical attenuator is a variable optical attenuator. This may enable variable control of the optical power of the said one of the optical carrier signals and therefore variable control of the optical signal power ratio between the said one of the optical carrier signal portions and the carrier suppressed optical subcarrier signals.

In an embodiment, each polarisation apparatus comprises the respective optical splitter, which is a polarisation maintaining optical splitter, the respective electro-optic modulation apparatus, each of which is polarisation maintaining, and a respective plurality of polarisation maintaining optical waveguides. Each waveguide is arranged to couple the optical splitter to the electro-optic modulation apparatus and to couple the electro-optic modulation apparatus to the optical combiner. This may ensure polarisation alignment between the said one of the optical carrier signals and the carrier suppressed optical subcarrier signals of each RoF transmitter prior to combination, which may ensure correct detection of each subcarrier multiplexed optical signal.

In an embodiment, each polarisation apparatus comprises a plurality of polarisation controllers. A respective polarisation controller is provided between each electro-optic modulation apparatus and the optical combiner and between the optical splitter and the optical combiner.

In an embodiment, each electrical modulator in the radio-over-fibre transmitter in the second base station node is an electrical mixer. This may provide a simple and cost effective arrangement for generating the modulated radio frequency subcarrier signals.

In an embodiment, each radio-over-fibre transmitter further comprises an optical source arranged to generate the optical carrier signal. This may enable the optical carrier signal to be locally generated and the optical power and wavelength of the optical carrier signal to be locally set.

In an embodiment, each optical combiner is an optical beam collimator. Use of an optical beam collimator may enable the said one of the optical carrier signals and the carrier suppressed optical subcarrier signals to be collimated into a single output optical waveguide, thereby avoiding output coupling losses.

In an embodiment, the radio frequency subcarrier signal frequencies received by the first base station node and the second base station node are selected so that optical subcarrier signal spectra in each subcarrier multiplexed optical signal do not overlap. This may ensure that each optical collimator does not combine two carrier suppressed optical subcarrier signals of same optical frequency but different phase, which would cause constructive or destructive interference to occur.

In an embodiment, the radio frequency subcarrier signal frequencies have a frequency spacing of at least 20 MHz. In an embodiment, the radio frequency subcarrier signal frequencies have a frequency spacing in the range 20 MHz to 40 MHz.

In an embodiment, each electro-optic modulation apparatus is an electro-optic modulator having a transfer function having a minimum transmission point. Each electro-optic modulator is biased so that the minimum transmission point is at the optical frequency of the optical carrier signal. This enables the electro-optic modulators to suppress transmission of the respective optical carrier signal portions.

In an embodiment, each electro-optic modulation apparatus comprises an electro-optic modulator and an optical filter. The optical filter is arranged to suppress transmission of the respective optical carrier signal portion. This enables the electro-optic modulation apparatus to suppress transmission of the respective optical carrier signal portions.

In an embodiment, each optical splitter is separated from the respective optical combiner by a first optical path length, each optical splitter is separated from each of the respective plurality of electro-optic modulation apparatus by a respective second optical path length and each plurality of electro-optic modulation apparatus are separated from the respective optical combiner by a third optical path length. Each respective said one of the optical carrier signal portions is transmitted across a respective first total optical path length from the respective optical splitter to the respective optical combiner and each respective carrier suppressed optical subcarrier signals is transmitted across a respective second total optical path length from the respective optical splitter to the respective optical combiner. Each of the first, second and third optical path lengths are selected such that a difference between the first total optical path length and the respective second total optical path lengths is less than a preselected maximum path length difference. This may ensure that any noise generated by the phase mismatch resulting from the path length difference between the optical carrier and the subcarriers of each respective subcarrier multiplexed optical signal can be compensated for at a respective receiver apparatus using electronic digital signal processing.

In an embodiment, each radio-over-fibre transmitter is a photonic integrated structure. Photonic integration may enable the RoF transmitter to be produced on a single chip and may ensure proper polarisation alignment of the said one of the optical carrier signals and the carrier suppressed optical subcarrier signals.

A fifth aspect of the invention provides a method of transmitting radio frequency communications signals over an optical fibre. The method comprises receiving a plurality of modulated radio frequency subcarrier signals. The method comprises providing an optical carrier signal having a carrier optical frequency and splitting the optical carrier signal into a plurality of optical carrier signal portions. One of the optical carrier signal portions is selected for onward transmission. Each other optical carrier signal portion is modulated with a respective one of the modulated radio frequency subcarrier signals and onward transmission of each said other optical carrier signal portion is suppressed. A plurality of carrier suppressed optical subcarrier signals is thereby formed, each carrier suppressed optical subcarrier signal having a respective optical frequency, different to the carrier optical frequency. The method comprises combining the selected optical carrier signal portion and the carrier suppressed optical subcarrier signals to form a subcarrier multiplexed optical signal. The method comprises ensuring that the carrier suppressed optical subcarrier signals and the selected optical carrier signal portion each have the same polarisation state when they are combined.

The method may enable a plurality of modulated radio frequency subcarrier signals to be carried on a single optical carrier signal without any intermodulation products being generated both between the radio frequency signal and the optical carrier and between the subcarriers. This may therefore enable a higher number of modulated radio frequency subcarrier signals to be carried on a single optical carrier signal than is possible using the prior art techniques discussed above. The method may enable a plurality of modulated radio frequency subcarrier signals to be modulated on a single optical carrier signal with lower latency and power consumption than when using prior art digital RoF techniques. The method may offer higher optical modulation efficiency than is possible when multiplexed RF signals are modulated onto an optical carrier, which may enable a subcarrier multiplexed optical signal to be generated having an increased power budget.

In an embodiment, the method further comprises attenuating the selected optical carrier signal portion before combining it with the carrier suppressed optical subcarrier signals. This may enable the optical signal power ratio between the said one of the optical carrier signal portions (in prior art terms the 'optical carrier') and the carrier suppressed optical subcarrier signals (the 'subcarriers') to be adjusted, which may enable transmission performance at an optical receiver arranged to receive the subcarrier multiplexed optical signal to be increased. In conventional subcarrier multiplexing techniques it is not possible to finely optimize this ratio.

In an embodiment, the attenuation may be variable. This may enable variable control of the optical power of the said one of the optical carrier signals and therefore variable control of the optical signal power ratio between the said one of the optical carrier signal portions and the carrier suppressed optical subcarrier signals.

In an embodiment, the optical carrier signal has a polarisation state. The method comprises maintaining the polarisation state during the splitting of the optical carrier signal into the optical carrier signal portions and maintaining the polarisation state during the modulation of the optical carrier signal portions, such that the selected optical carrier signal portion and the carrier suppressed optical carrier signals each have the same polarisation state when they are combined. This may ensure polarisation alignment between the said one of the optical carrier signals and the carrier suppressed optical subcarrier signals prior to combination, which may ensure correct detection of the subcarrier multiplexed optical signal.

In an embodiment, the method additionally comprises receiving a plurality of radio frequency communications signals and providing a plurality of radio frequency subcarrier signals, each radio frequency subcarrier signal having a different frequency. Each radio frequency subcarrier signal is modulated with a respective one of the radio frequency communications signals to form a respective one of the modulated radio frequency subcarrier signals. The method may therefore include generation of the modulated radio frequency subcarrier signals.

In an embodiment, each radio frequency subcarrier signal is modulated with a respective one of the radio frequency communications signals by mixing each radio frequency subcarrier signal with a respective one of the radio frequency communications signals. This may provide a simple and cost effective way of generating the modulated radio frequency subcarrier signals.

In an embodiment, the method additionally comprises generating the optical carrier signal. This may enable the method to set the optical power and wavelength of the optical carrier signal.

In an embodiment, the radio frequency subcarrier signal frequencies are selected so that optical subcarrier signal spectra do not overlap. This may ensure that carrier suppressed optical subcarrier signals of same optical frequency but different phase are not combined, which would cause constructive or destructive interference to occur.

In an embodiment, the radio frequency subcarrier signal frequencies have a frequency spacing of at least 20 MHz. In an embodiment, the radio frequency subcarrier signal frequencies have a frequency spacing in the range 20 MHz to 40 MHz.

In an embodiment, the said one of the optical carrier signal portions is transmitted across a first total optical path length and each of the carrier suppressed optical subcarrier signals is transmitted across a respective second total optical path length. The method comprises controlling a difference between the first total optical path length and the respective second total optical path lengths to be less than a preselected maximum path length difference. This may ensure that any noise generated by the phase mismatch resulting from the path length difference between the optical carrier and the subcarriers can be compensated for using electronic digital signal processing when the subcarrier multiplexed optical signal is received.

A sixth aspect of the invention provides a data carrier having computer readable instructions embodied therein, the computer readable instructions being for providing access to resources available on a processor and the computer readable instructions comprising instructions to cause the processor to perform any of the above steps of the method of transmitting radio frequency communications signals over an optical fibre.

In an embodiment, the data carrier is a non-transitory data carrier.

Embodiments of the invention will now be described, by way of example only, with reference to the accompanying drawings.

DETAILED DESCRIPTION

Figure 1:
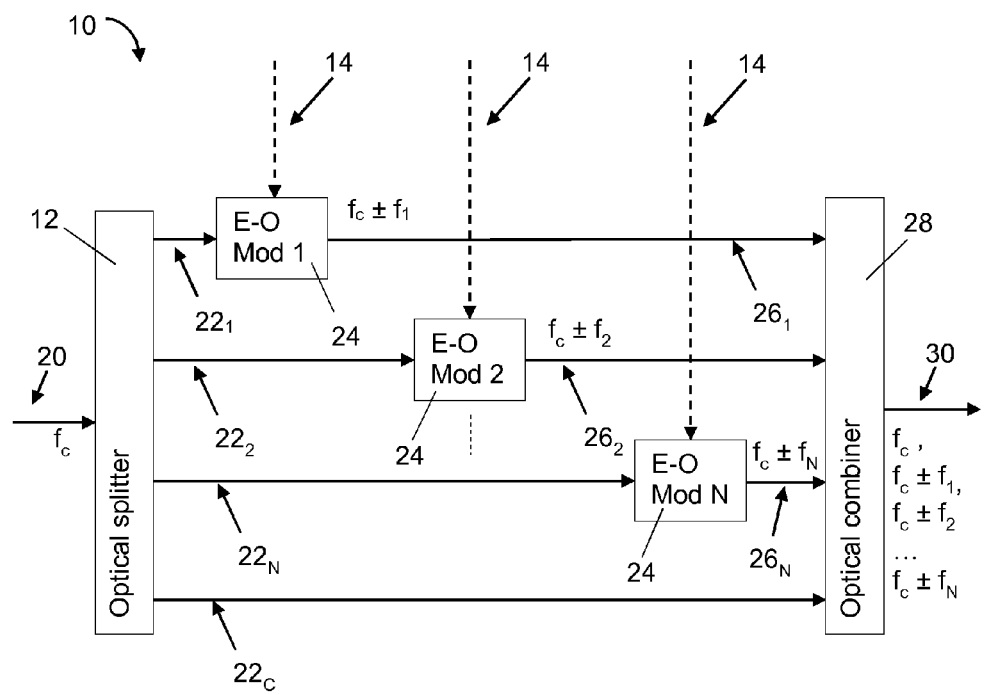
FIG. 1 is a schematic representation of a radio-over-fibre transmitter according to a first embodiment of the invention.

Referring to FIG. 1, a first embodiment of the invention provides a radio-over-fibre, RoF, transmitter 10 comprising an optical splitter 12, a plurality of electro-optic modulation apparatus 24, an optical combiner 28 and polarisation apparatus.

The optical splitter 12 is arranged to receive an optical carrier signal 20 having a carrier optical frequency. The optical splitter is arranged split the optical carrier signal into a plurality of optical carrier signal portions $22_1$-$22_N$ and $22_C$.

Each of the electro-optic modulation apparatus 24 is arranged to receive a respective one of the optical carrier signal portions and a respective one of a plurality of modulated radio frequency subcarrier signals 14. Each electro-optic modulation apparatus is arranged to modulate the respective optical carrier signal portion with the respective modulated radio frequency subcarrier signal. In addition, each electro-optic modulation apparatus is arranged to suppress onward transmission of the respective optical carrier signal portion, to thereby form a respective carrier suppressed optical subcarrier signal $26_1$-$26_N$ at a respective optical frequency. The optical frequency of each carrier suppressed optical subcarrier signal is different to the carrier optical frequency.

The optical combiner 28 is arranged to receive the carrier suppressed optical subcarrier signals $26_1$-$26_N$ and the remaining one of the optical carrier signal portions $22_C$. The optical combiner is arranged to combine the carrier suppressed optical subcarrier signals $26_1$-$26_N$ and the remaining optical carrier signal portion $22_C$ to form a subcarrier multiplexed optical signal 30.

The polarisation apparatus is this embodiment comprises the optical splitter and the electro-optic modulation apparatus, each of which are arranged to ensure that the carrier suppressed optical subcarrier signals $26_1$-$26_N$ and the remaining optical carrier signal portion $22_C$ each have the same polarisation state at the optical combiner. However it will be appreciated that any arrangement of optical apparatus can be used which ensures that the carrier suppressed optical subcarrier signals $26_1$-$26_N$ and the remaining optical carrier signal portion $22_C$ each have the same polarisation state at the optical combiner.

It will be appreciated that radio frequency is used here to mean any radio wave signal within the electromagnetic spectrum, including RF, microwave and millimetre wave signals.

Figure 2:
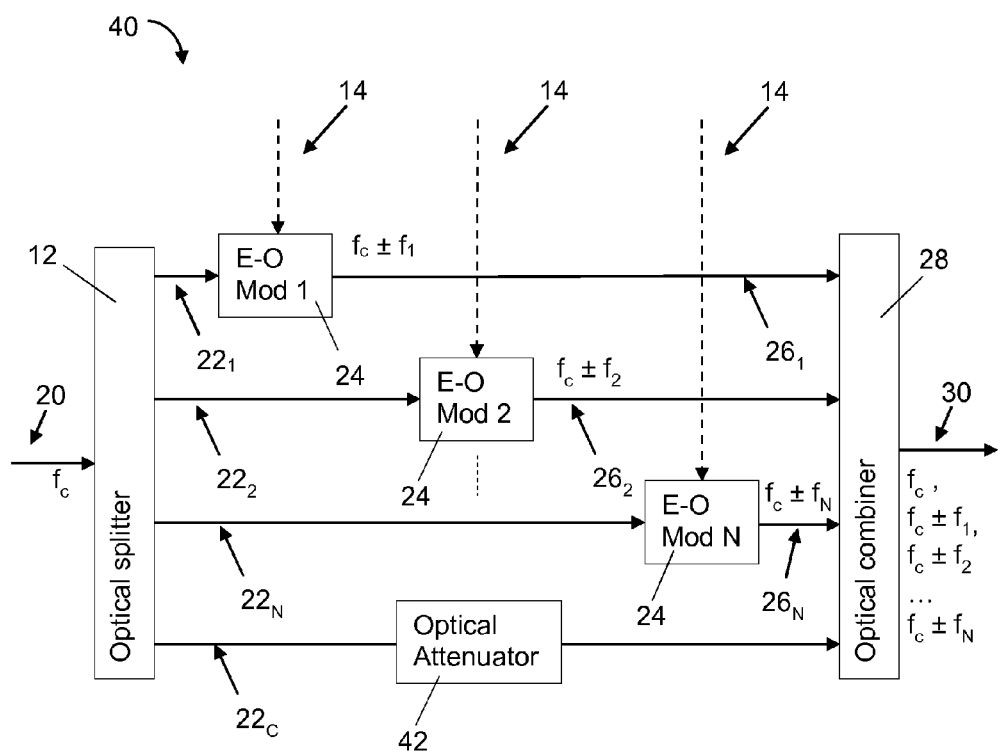
FIG. 2 is a schematic representation of a radio-over-fibre transmitter according to a second embodiment of the invention.

A second embodiment of the invention provides an RoF transmitter 40 as shown in FIG. 2. The RoF transmitter 40 of this embodiment is similar to the RoF transmitter 10 of the first embodiment, with the following modifications. The same reference numbers are retained for corresponding features.

In this embodiment, an optical attenuator 42 is provided between the optical splitter 12 and the optical combiner 28 in the path of the remaining optical carrier signal portion $22_C$. The optical attenuator is arranged to apply an attenuation to the remaining optical carrier signal portion $22_C$.

Figure 3:
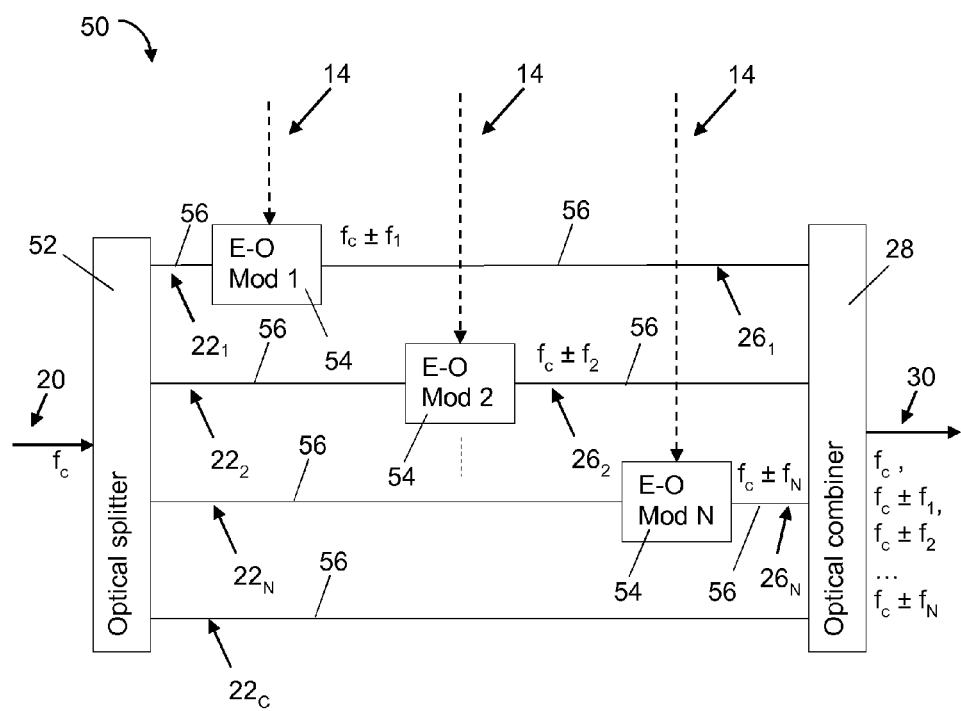
FIG. 3 is a schematic representation of a radio-over-fibre transmitter according to a third embodiment of the invention.

A third embodiment of the invention provides an RoF transmitter 50 as shown in FIG. 3. The RoF transmitter 50 of this embodiment is similar to the RoF transmitter 10 of the first embodiment, with the following modifications. The same reference numbers are retained for corresponding features.

In this embodiment, the RoF transmitter additionally comprises a plurality of polarisation maintaining optical waveguides 56 provided between the optical splitter 52 and the electro-optic modulation apparatus 54 and between the electro-optic modulation apparatus 54 and the optical combiner 28. The optical splitter 52 is polarisation maintaining and the electro-optic modulation apparatus 54 are each polarisation maintaining. The optical splitter 52, electro-optic modulation apparatus 54 and the optical waveguides 56 together form the polarisation apparatus which ensures that the carrier suppressed optical subcarrier signals $26_1$-$26_N$ and the remaining optical carrier signal portion $22_C$ each have the same polarisation state at the optical combiner.

Figure 4:
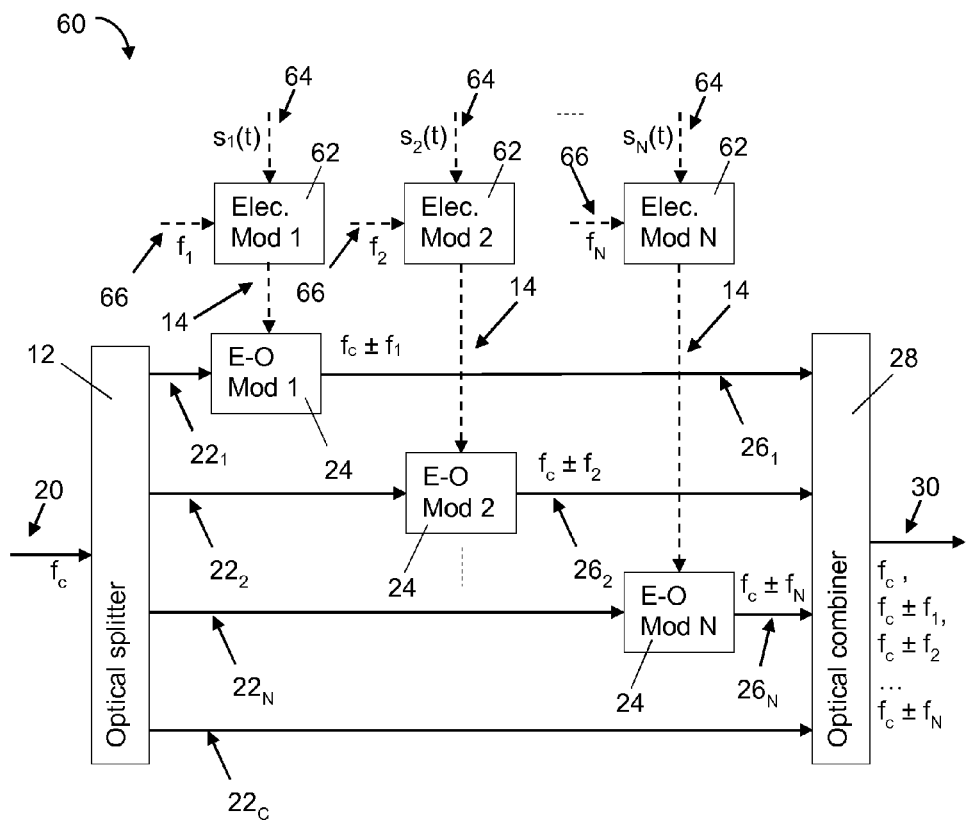
FIG. 4 is a schematic representation of a radio-over-fibre transmitter according to a fourth embodiment of the invention.

A fourth embodiment of the invention provides an RoF transmitter 60 as shown in FIG. 4. The RoF transmitter 60 of this embodiment is similar to the RoF transmitter 10 of the first embodiment, with the following modifications. The same reference numbers are retained for corresponding features.

In this embodiment, the RoF transmitter 60 additionally comprises a plurality of electrical modulators 62. Each electrical modulator is arranged to receive a respective one of a plurality of radio frequency communications signals 64 and a respective radio frequency subcarrier signal 66. Each radio frequency subcarrier signal has a different frequency. Each electrical modulator is arranged to modulate the respective radio frequency subcarrier signal with the respective radio frequency communications signal to form a respective one of the modulated radio frequency subcarrier signals 14.

Figure 5:
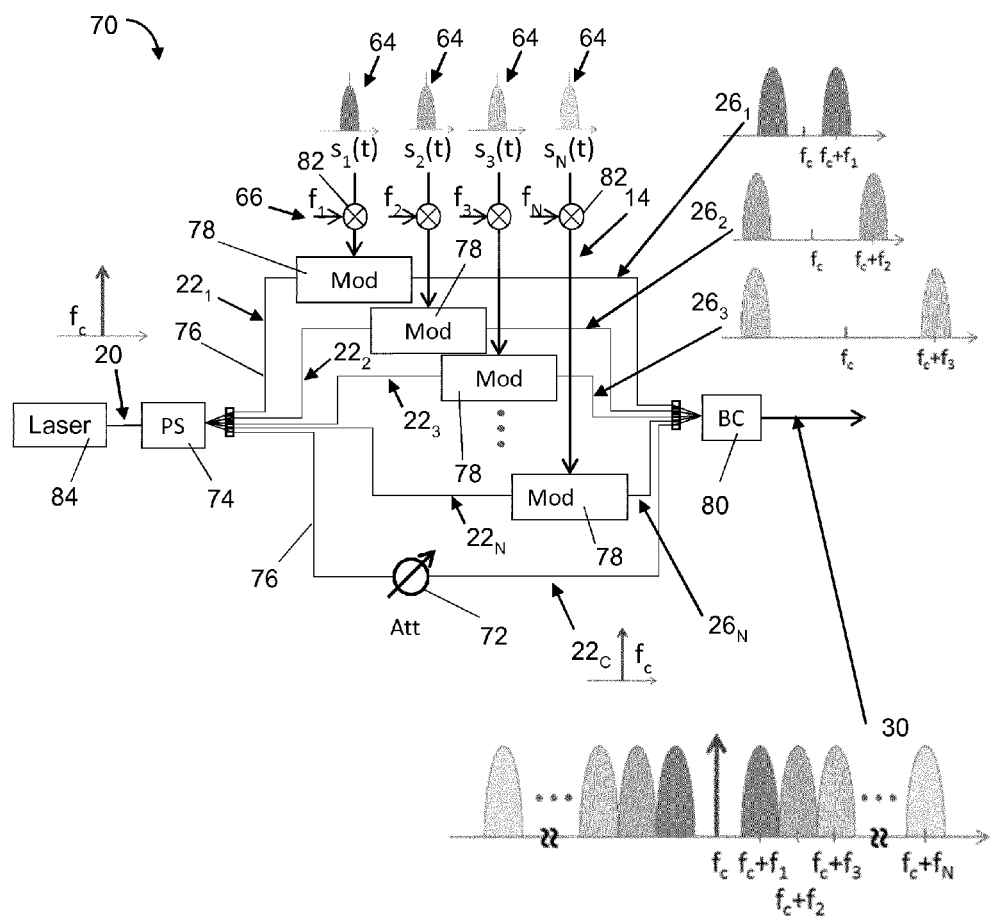
FIG. 5 is a schematic representation of a radio-over-fibre transmitter according to a fifth embodiment of the invention.

A fifth embodiment of the invention provides an RoF transmitter 70 as shown in FIG. 5. The RoF transmitter 70 of this embodiment is similar to the RoF transmitter 60 of the previous embodiment, with the following modifications. The same reference numbers are retained for corresponding features.

The RoF transmitter 70 of this embodiment is provided as a photonic integrated structure comprising an optical splitter, PS, 74, a plurality of electro-optic modulation apparatus 78, a plurality of electrical modulators 82, a plurality of polarisation maintaining waveguides 76, an optical attenuator 72 and an optical combiner 80. A laser 84 is also provided to generate the optical carrier signal 20. The laser 84 may be incorporated in the photonic integrated structure or may be provided separately to it.

Each electrical modulator is an electrical mixer 82 arranged to receive a respective radio frequency communications signal 64 and a respective radio frequency subcarrier signal 66. Each electrical mixer is arranged to modulate the respective radio frequency subcarrier signal with the respective radio frequency communications signal to form a respective modulated radio frequency subcarrier signal 14.

The optical splitter 74 is arranged to receive the optical carrier signal 20 from the laser 84 and split the optical carrier signal into a plurality of optical carrier signal portions $22_1$-$22_N$ and $22_C$. The optical splitter 74 is polarisation maintaining.

In this embodiment, each of the electro-optic modulation apparatus is a polarisation maintaining electro-optic modulator 78 having a respective transfer function having a minimum transmission point. Each electro-optic modulator is arranged to receive a respective one of the optical carrier signal portions $22_1$-$22_N$ and a respective one of the modulated radio frequency subcarrier signals 14. Each electro-optic modulator is arranged to modulate the respective optical carrier signal portion with the respective modulated radio frequency subcarrier signal. Each electro-optic modulator is biased so that its minimum transmission point is at the optical frequency of the optical carrier signal, so each electro-optic modulator suppresses onward transmission of the respective optical carrier signal portion. Each electro-optic modulator therefore forms a respective carrier suppressed optical subcarrier signal $26_1$-$26_N$ at a respective optical frequency. The optical frequency of each carrier suppressed optical subcarrier signal is different to the carrier optical frequency.

The optical combiner in this embodiment is a beam collimator, BC, 80 which is arranged to receive the carrier suppressed optical subcarrier signals $26_1$-$26_N$ and the remaining one of the optical carrier signal portions $22_C$. The beam collimator is arranged to combine the carrier suppressed optical subcarrier signals $26_1$-$26_N$ and the remaining optical carrier signal portion $22_C$ to form a subcarrier multiplexed optical signal 30.

The optical attenuator 72 is provided between the optical splitter 74 and the beam collimator 80 in the path of the remaining optical carrier signal portion $22_C$. The optical attenuator is arranged to apply an attenuation to the remaining optical carrier signal portion $22_C$.

Polarisation maintaining optical waveguides 76 are provided between the optical splitter 74 and the electro-optic modulators 78, between the electro-optic modulators and the beam collimator 80, between the optical splitter 74 and the optical attenuator 72, and between the optical attenuator and the beam collimator.

The length of each optical waveguide 76 is selected such that any difference in the optical path length from the optical splitter 74 to the beam collimator 80, along any of the optical paths via an electro-optic modulator or via the optical attenuator, is less than a maximum optical path length difference. This is the optical path length difference that equates to the maximum noise generated by the resulting phase mismatch between the remaining optical carrier signal portion $22_C$ and the carrier suppressed optical subcarrier signals $26_1$-$26_N$ which can be compensated for at a receiver apparatus using electronic digital signal processing, DSP. Conventional direct detection receiver apparatus and DSP techniques may be used.

Figure 6:
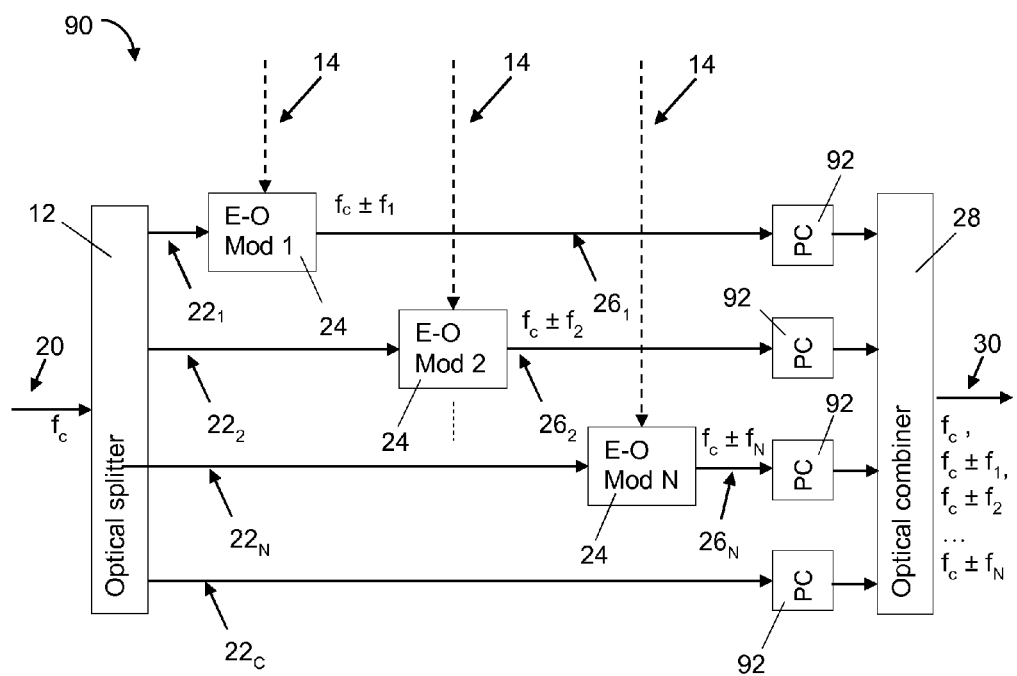
FIG. 6 is a schematic representation of a radio-over-fibre transmitter according to a sixth embodiment of the invention.

Referring to FIG. 6, a sixth embodiment of the invention provides an RoF transmitter 90. The RoF transmitter 90 of this embodiment is similar to the RoF transmitter 10 of the first embodiment, with the following modifications. The same reference numbers are retained for corresponding features.

In this embodiment, the RoF transmitter additionally comprises a plurality of polarisation controllers, PC, 92. A respective polarisation controller is provided between each electro-optic modulation apparatus 24, in the paths of the carrier suppressed optical subcarrier signals $26_1$-$26_N$. A further polarisation controller is provided between the optical splitter 12 and the optical combiner, in the path of the remaining optical carrier signal portion $22_C$. The polarisation controllers 92 are each arranged to ensure that the carrier suppressed optical subcarrier signals $26_1$-$26_N$ and the remaining optical carrier signal portion $22_C$ each have the same polarisation state at the optical combiner.

Each polarisation controller may be an active polarisation controller or a passive polarisation controller.

Figure 7:
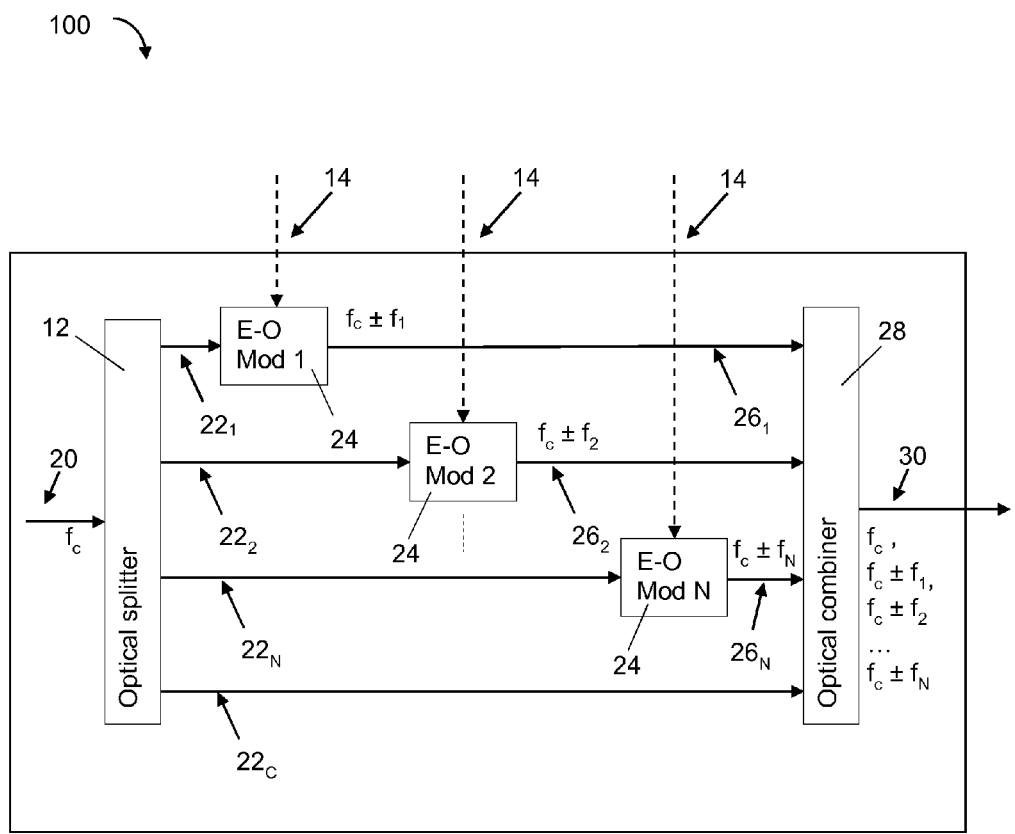
FIG. 7 is a schematic representation of a communications network base station node according to a seventh embodiment of the invention.

Referring to FIG. 7, a seventh embodiment of the invention provides a communications network base station node 100 comprising an RoF transmitter 10, as shown in FIG. 1.

Figure 8:
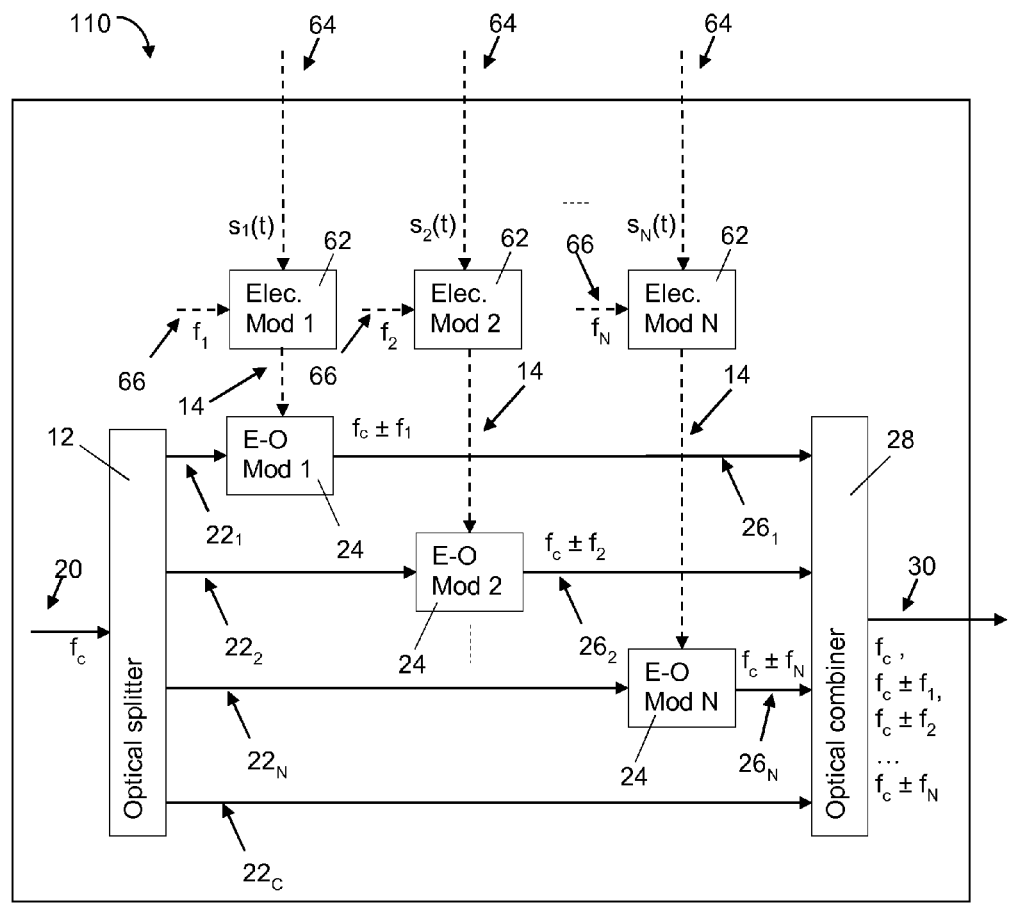
FIG. 8 is a schematic representation of a communications network base station node according to an eighth embodiment of the invention.

Referring to FIG. 8, an eighth embodiment of the invention provides a communications network base station node 110 comprising an RoF transmitter 60, as shown in FIG. 4. It will be appreciated that any of the RoF transmitters 40, 50, 70 shown in FIGS. 2, 3, 5 and 6 may alternatively be used.

Figure 9:
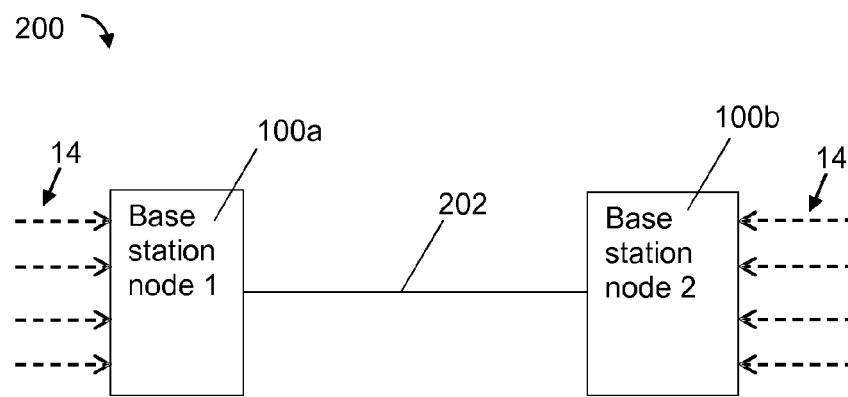
FIG. 9 is a schematic representation of a communications network base station system according to a ninth embodiment of the invention.

FIG. 9 shows a communications network base station system 200 according to a ninth embodiment of the invention.

The communications network base station system 200 comprises first and second base station nodes 100a, 100b, according to the seventh embodiment of the invention shown in FIG. 7, and an optical fibre 202 coupled between the first base station node and the second base station node.

Each base station node 100 comprises an RoF transmitter 10 according to the first embodiment of the invention, as shown in FIG. 1. It will be appreciated that any of the RoF transmitters 40, 50, 60, 70, 90 shown in FIGS. 2 to 6 may alternatively be used.

Figure 10:
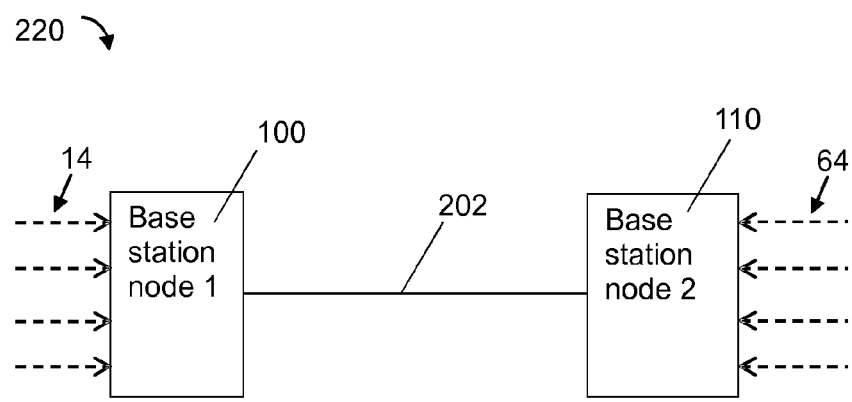
FIG. 10 is a schematic representation of a communications network base station system according to a tenth embodiment of the invention.

FIG. 10 shows a communications network base station system 220 according to a tenth embodiment of the invention. The communications network base station system 220 of this embodiment is similar to the communications network base station system 200 of the previous embodiment, with the following modifications.

In this embodiment, the second base station node 110 comprises an RoF transmitter 60 according to the fourth embodiment of the invention, shown in FIG. 4. An RoF transmitter 70 according to the fifth embodiment of the invention, shown in FIG. 5, may alternatively be used. As in those embodiments, each electrical modulator 62, 82 is arranged to receive a respective radio frequency communications signal 64.

Figure 11:
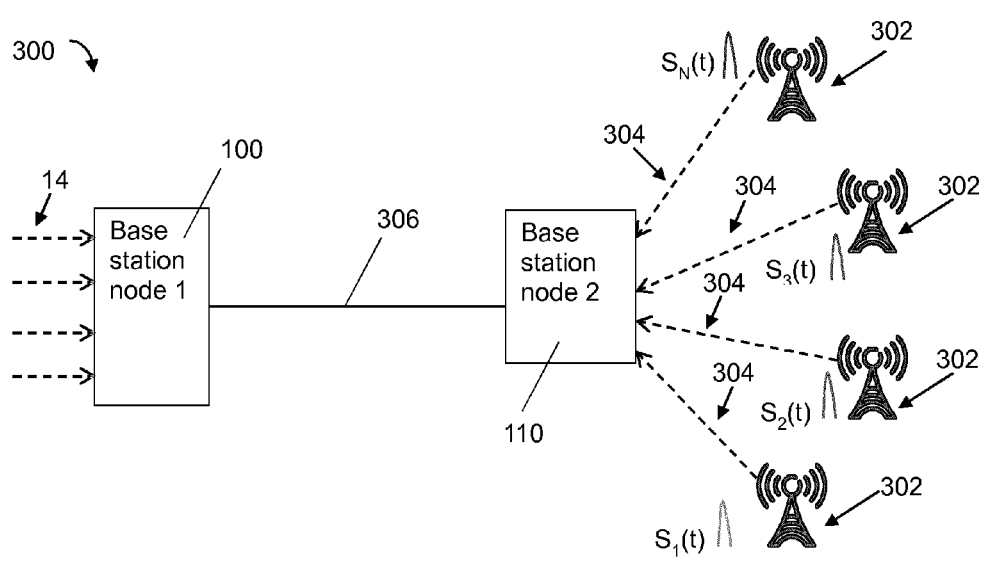
FIG. 11 is a schematic representation of a communications network according to an eleventh embodiment of the invention.

Referring to FIG. 11, an eleventh embodiment of the invention provides a communications network 300 comprising a first base station node 100, a second base station node 110, a plurality of radio antennas 302 and an optical fibre 306 coupled between the first base station node and the second base station node.

Each radio antenna 302 is configured to transmit a respective radio frequency communications signal 304.

The first base station node 100 is as described in the seventh embodiment, shown in FIG. 7, and the second base station node 110 is as described in the eighth embodiment, shown in FIG. 8. In the second base station node, each electrical modulator 62 of the RoF transmitter 60 is arranged to receive a respective one of the radio frequency communications signals transmitted by the radio antennas.

Figure 12:
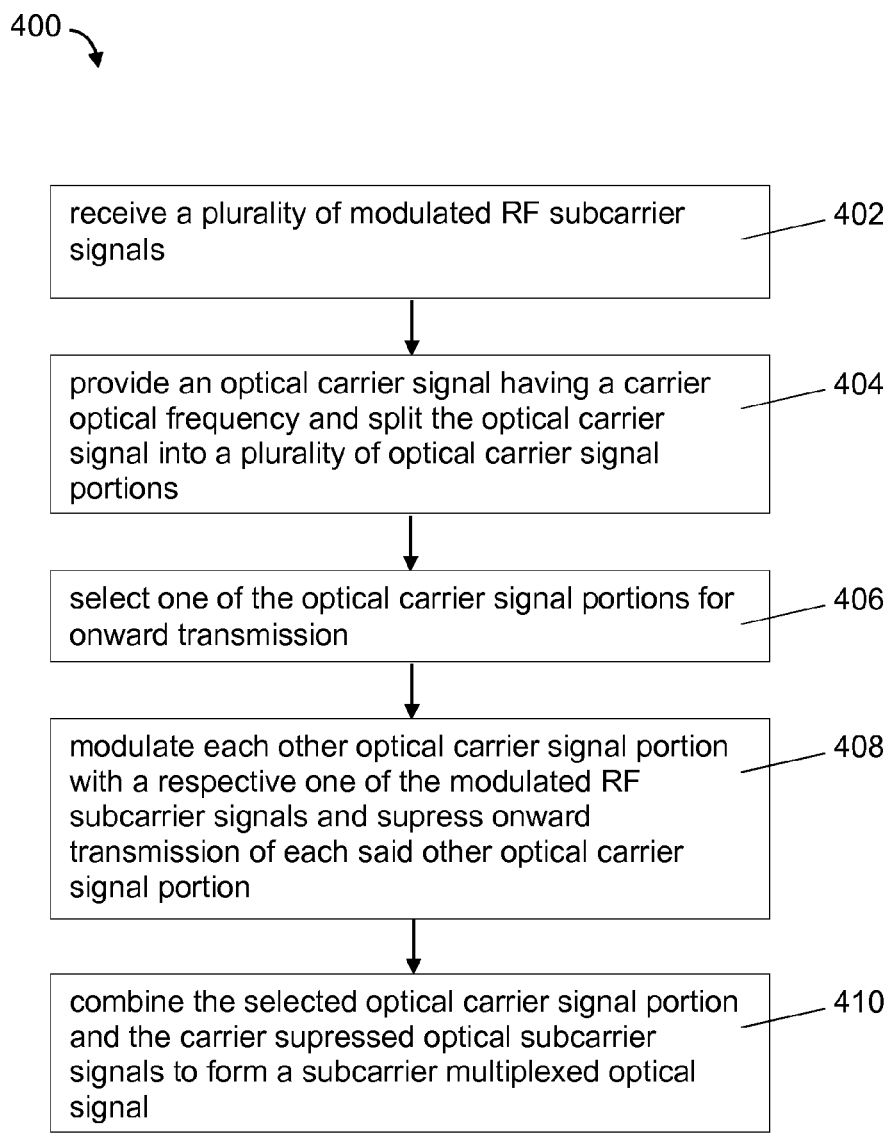
FIG. 12 shows the steps of a method according to a twelfth embodiment of the invention of transmitting radio frequency communications signals over an optical fibre.

FIG. 12 shows the steps of a method 400 according to a twelfth embodiment of the invention of transmitting radio frequency communications signals over an optical fibre.

The method 400 comprises receiving a plurality of modulated radio frequency subcarrier signals 402 and providing an optical carrier signal having a carrier optical frequency 404. The optical carrier signal is split into a plurality of optical carrier signal portions 404 and one of the optical carrier signal portions is selected for onward transmission 406.

Each other optical carrier signal portion, that is to say all those not selected for onward transmission, is modulated with a respective one of the modulated radio frequency subcarrier signals 408. Onward transmission of each of these optical carrier signal portions is suppressed. A plurality of carrier suppressed optical subcarrier signals each having a respective optical frequency, different to the carrier optical frequency, is thereby formed 408.

The selected optical carrier signal portion is combined with the carrier suppressed optical subcarrier signals to form a subcarrier multiplexed optical signal 412. The steps of the method are performed ensuring that the polarisations of the carrier suppressed optical subcarrier signals and the polarisation of the selected optical carrier signal portion all have the same polarisation state when they are combined.

Figure 13:
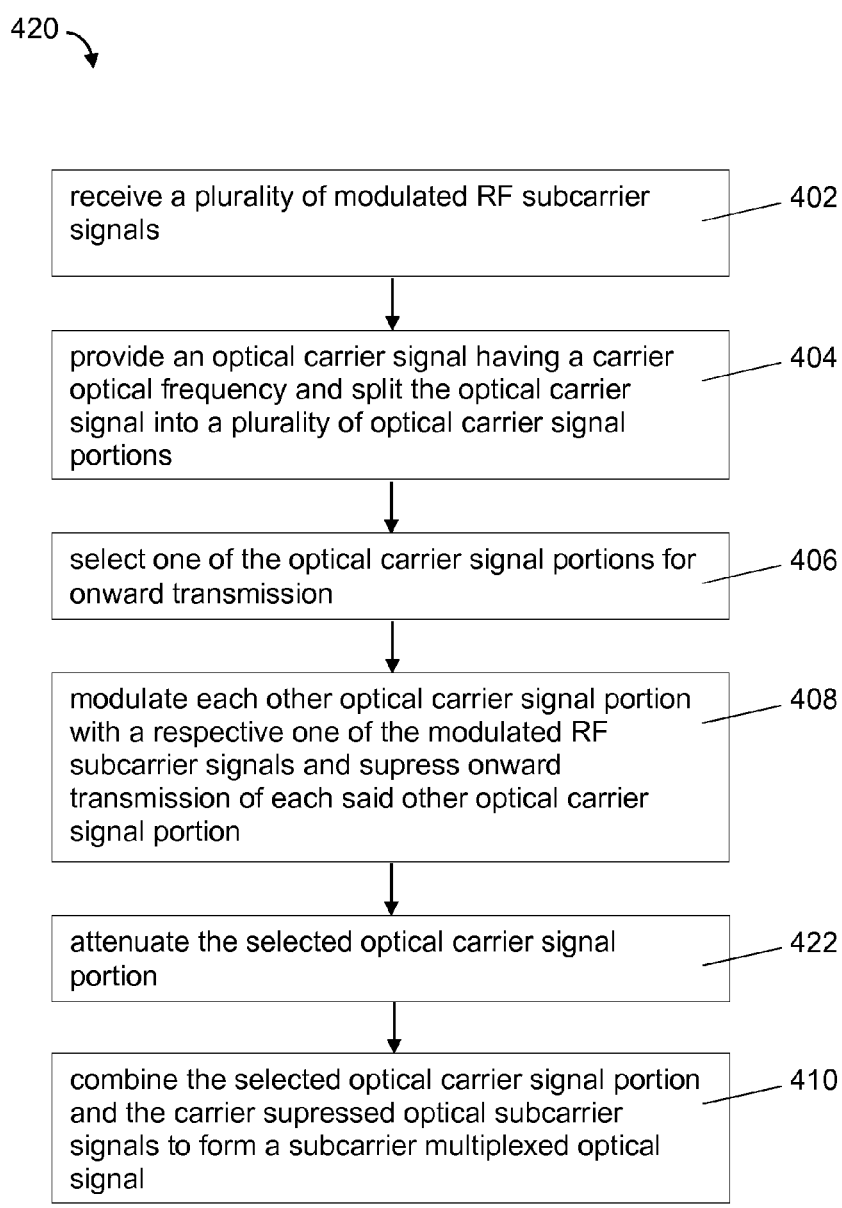
FIG. 13 shows the steps of a method according to a thirteenth embodiment of the invention of transmitting radio frequency communications signals over an optical fibre.

FIG. 13 shows the steps of a method 420 according to a thirteenth embodiment of the invention of transmitting radio frequency communications signals over an optical fibre. The method 420 of this embodiment is similar to the method 400 of the previous embodiment, with the following modifications. The same reference numbers are retained for corresponding steps.

In this embodiment, the method 420 comprises the additional step of attenuating the selected optical carrier signal portion 422 before combining it with the carrier suppressed optical subcarrier signals.

Figure 14:
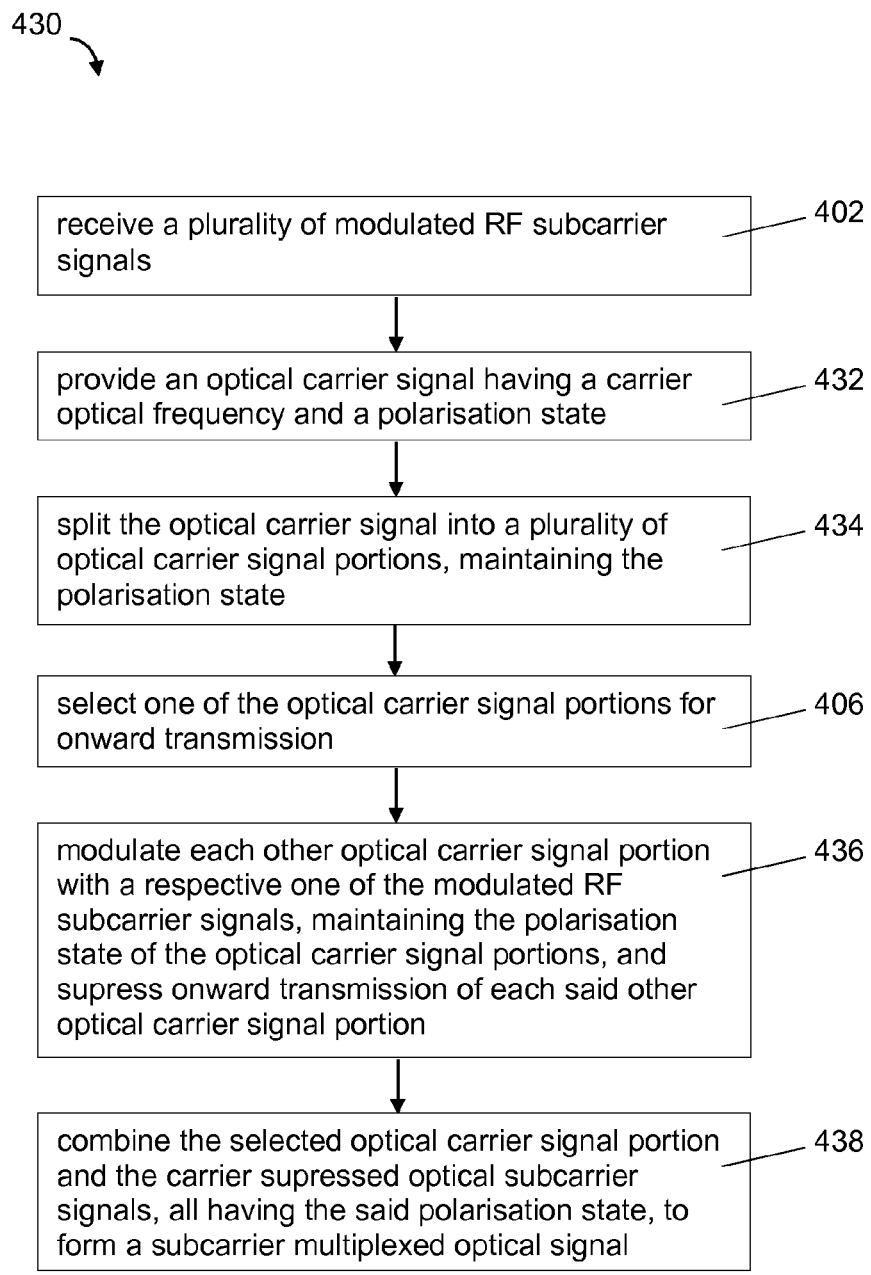
FIG. 14 shows the steps of a method according to a fourteenth embodiment of the invention of transmitting radio frequency communications signals over an optical fibre.

FIG. 14 shows the steps of a method 430 according to a fourteenth embodiment of the invention of transmitting radio frequency communications signals over an optical fibre. The method 430 of this embodiment is similar to the method 400 of the twelfth embodiment, with the following modifications. The same reference numbers are retained for corresponding steps.

In this embodiment, the optical carrier signal has a polarisation state 432. The method comprises maintaining the polarisation state during the splitting of the optical carrier signal into the optical carrier signal portions 434 and maintaining the polarisation state during the modulation of the optical carrier signal portions 436. This is to ensure that the selected optical carrier signal portion and the carrier suppressed optical carrier signals each have the same polarisation state when they are combined 438.

Figure 15:
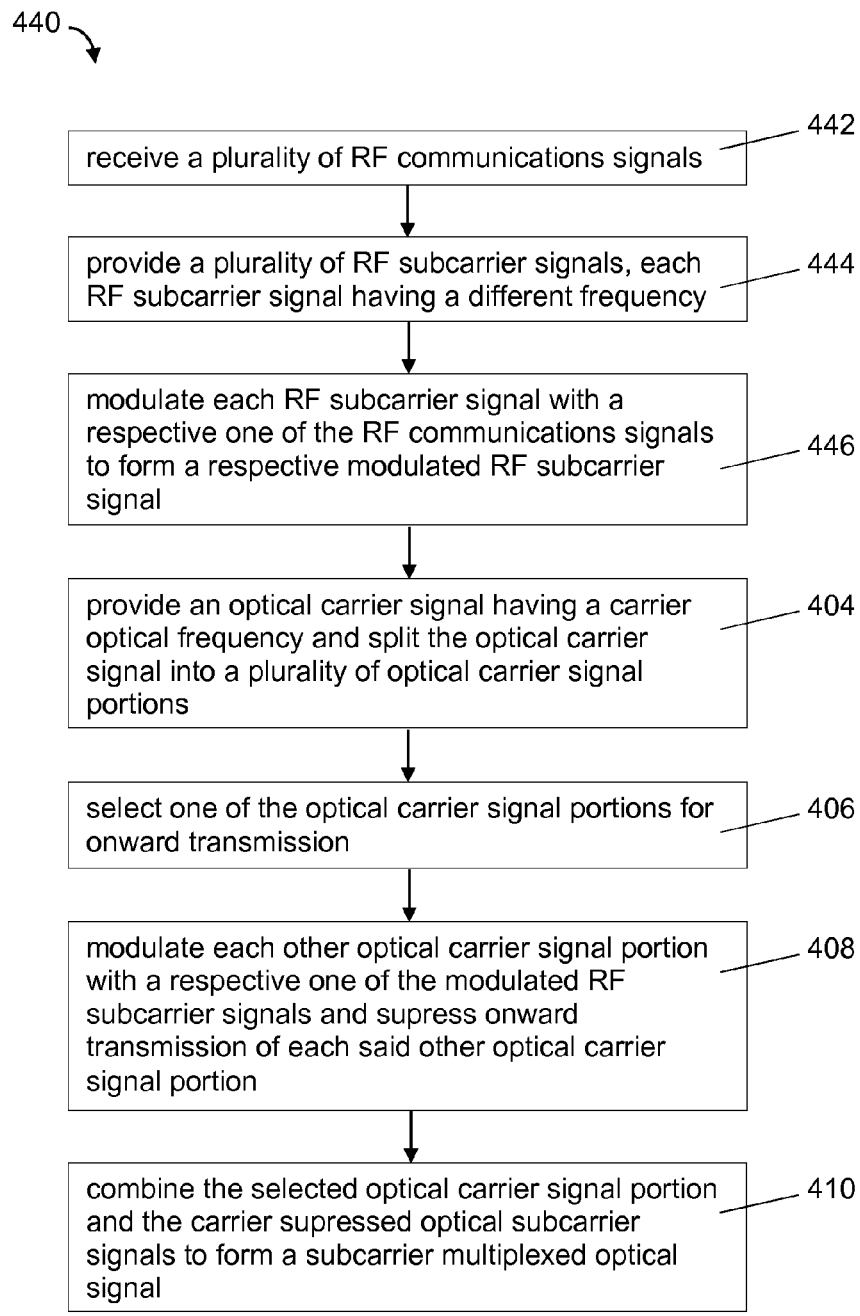
FIG. 15 shows the steps of a method according to a fifteenth embodiment of the invention of transmitting radio frequency communications signals over an optical fibre.

FIG. 15 shows the steps of a method 440 according to a fifteenth embodiment of the invention of transmitting radio frequency communications signals over an optical fibre. The method 440 of this embodiment is similar to the method 400 of the twelfth embodiment, with the following modifications. The same reference numbers are retained for corresponding steps.

In this embodiment, the method additionally comprises receiving a plurality of radio frequency communications signals 442 and providing a plurality of radio frequency subcarrier signals, each having a different frequency 444. Each radio frequency subcarrier signal is then modulated with a respective one of the radio frequency communications signals to form a respective modulated radio frequency subcarrier signal 446. These radio frequency subcarrier signals are modulated onto the optical carrier signal portions 408.

A sixteenth embodiment of the invention provides a data carrier having computer readable instructions embodied therein. The computer readable instructions are for providing access to resources available on a processor and comprise instructions to cause the processor to perform any of the steps of the method of transmitting radio frequency communications signals over an optical fibre according to any one of the eleventh to fourteenth embodiments.

The invention claimed is:

1. A radio-over-fibre transmitter comprising:
an optical splitter arranged to receive an optical carrier signal having a carrier optical frequency and arranged to split the optical carrier signal into a plurality of optical carrier signal portions;
a plurality of electro-optic modulation apparatus each arranged to receive a respective optical carrier signal portion of the optical carrier signal portions and a respective modulated radio frequency subcarrier signal of a plurality of modulated radio frequency subcarrier signals, and each of the plurality of electro-optic modulation apparatus arranged to modulate the respective optical carrier signal portions with the respective modulated radio frequency subcarrier signal and arranged to suppress onward transmission of the respective optical carrier signal portions, to form a respective carrier suppressed optical subcarrier signal at a respective optical frequency, different from the carrier optical frequency;
an optical combiner arranged to receive the carrier suppressed optical subcarrier signals and an optical carrier signal portion which is not suppressed for onward transmission and arranged to combine said carrier suppressed optical subcarrier signals and the optical carrier signal portion which is not suppressed for onward transmission to form a subcarrier multiplexed optical signal; and
polarization apparatus arranged to ensure that the carrier suppressed optical subcarrier signals and the optical carrier signal portion which is not suppressed for onward transmission each have a same polarization state at the optical combiner.

2. The radio-over-fibre transmitter as claimed in claim 1, further comprising an optical attenuator provided between the optical splitter and the optical combiner, the optical attenuator arranged to apply an attenuation to the optical carrier signal portion which is not suppressed for onward transmission.

3. The radio-over-fibre transmitter as claimed in claim 1, wherein the polarization apparatus comprises: the optical splitter, which is a polarization maintaining optical splitter, the plurality of electro-optic modulation apparatus, each of which is polarization maintaining, and a plurality of polarization maintaining optical waveguides arranged to couple the optical splitter to the plurality of electro-optic modulation apparatus and to couple the plurality of electro-optic modulation apparatus to the optical combiner.

4. The radio-over-fibre transmitter as claimed in claim 1, further comprising: a plurality of electrical modulators each arranged to receive a respective radio frequency communications signal of a plurality of radio frequency communications signals and a respective radio frequency subcarrier signal of a plurality of radio frequency subcarrier signals, each radio frequency subcarrier signal having a different frequency, and each of the plurality of electrical modulators arranged to modulate the respective radio frequency subcarrier signal with the respective radio frequency communications signal to form the respective modulated radio frequency subcarrier signal.

5. The radio-over-fibre transmitter as claimed in claim 1, wherein the optical splitter is separated from the optical combiner by a first optical path length, the optical splitter is separated from each of the plurality of electro-optic modulation apparatus by a respective second optical path length and each of the plurality of electro-optic modulation apparatus is separated from the optical combiner by a third optical path length, wherein the optical carrier signal portion which is not suppressed for onward transmission is transmitted across a first total optical path length from the optical splitter to the optical combiner and each of the carrier suppressed optical subcarrier signals is transmitted across a respective second total optical path length from the optical splitter to the optical combiner, and the first, the second and the third optical path lengths are selected such that a difference between the first total optical path length and the respective second total optical path lengths is less than a preselected maximum path length difference.

6. The radio-over-fibre transmitter as claimed in claim 1, wherein the radio-over-fibre transmitter is a photonic integrated structure.

7. A communications network base station node comprising: the radio-over-fibre transmitter as claimed in claim 1.

8. A communications network base station system comprising:
- a first base station node and a second base station node, wherein each of the first and the second base station nodes further comprises: the radio-over-fibre transmitter as claimed in claim 1; and
- wherein the communications network further comprises: an optical fibre coupled between the first base station node and the second base station node.

9. The communications network base station system as claimed in claim 8, wherein the radio-over-fibre transmitter of the second base station node comprises: a plurality of electrical modulators each arranged to receive a respective radio frequency communications signal of a plurality of radio frequency communications signals and a respective radio frequency subcarrier signal of a plurality of radio frequency subcarrier signals, each of the plurality of radio frequency subcarrier signals having a different frequency, and each of the plurality of electrical modulators arranged to modulate the respective radio frequency subcarrier signal with the respective radio frequency communications signal to form the respective modulated radio frequency subcarrier signal.

10. A communications network comprising:
- a first base station node and a second base station node, wherein each of the first and the second base station nodes further comprises the radio-over-fibre transmitter as claimed in claim 1; and
- a plurality of radio antennas each configured to transmit a respective radio frequency communications signal;
- wherein the radio-over-fibre transmitter of the second base station node further comprises: a plurality of electrical modulators each arranged to receive the respective radio frequency communications signal of a plurality of radio frequency communications signals and a respective radio frequency subcarrier signal of the plurality of radio frequency subcarrier signals, each radio frequency subcarrier signal having a different frequency, and each of the plurality of electrical modulators arranged to modulate the respective radio frequency subcarrier signal with the respective radio frequency communications signal to form the respective modulated radio frequency subcarrier signal, and
- wherein each of the plurality of electrical modulators is arranged to receive the respective radio frequency communications signal of the radio frequency communications signals transmitted by the radio antennas; and
- wherein the communications network further comprises an optical fibre coupled between the first base station node and the second base station node.

11. A method of transmitting radio frequency communications signals over an optical fibre, the method comprising:
- receiving a plurality of modulated radio frequency subcarrier signals;
- providing an optical carrier signal having a carrier optical frequency and splitting the optical carrier signal into a plurality of optical carrier signal portions;
- selecting one of the optical carrier signal portions for onward transmission;
- modulating each one of other optical carrier signal portions with a respective modulated radio frequency subcarrier signal of the plurality of modulated radio frequency subcarrier signals and suppressing onward transmission of each of said other optical carrier signal portions, to form a plurality of carrier suppressed optical subcarrier signals each having a respective optical frequency, different from the carrier optical frequency;
- combining the selected optical carrier signal portion and the carrier suppressed optical subcarrier signals to form a subcarrier multiplexed optical signal; and
- controlling the carrier suppressed optical subcarrier signals and the selected optical carrier signal portion to each have a same polarization state when they are combined.

12. The method as claimed in claim 11, further comprising: attenuating the selected optical carrier signal portion before combining it with the carrier suppressed optical subcarrier signals.

13. The method as claimed in claim 11, wherein the optical carrier signal has a polarization state and the method further comprises: maintaining the polarization state during the splitting of the optical carrier signal into the optical carrier signal portions and maintaining the polarization state during the modulation of the optical carrier signal portions, such that the selected optical carrier signal portion and the carrier suppressed optical subcarrier signals each have the same polarization state when they are combined.

14. The method as claimed in claim 11, wherein the method further comprises:
- receiving a plurality of radio frequency communications signals;
- providing a plurality of radio frequency subcarrier signals, each radio frequency subcarrier signal having a different frequency; and
- modulating each of the plurality of radio frequency subcarrier signals with a respective radio frequency communications signal of the plurality of radio frequency communications signals to form the plurality of modulated radio frequency subcarrier signals.

15. A nontransitory computer readable storage medium having computer readable instructions embodied therein, the computer readable instructions being used for providing access to resources available on a processor and the computer readable instructions comprising instructions to cause the processor to perform a method of transmitting radio frequency communications signals over an optical fibre, wherein the method comprises:
- receiving a plurality of modulated radio frequency subcarrier signals;
- providing an optical carrier signal having a carrier optical frequency and splitting the optical carrier signal into a plurality of optical carrier signal portions;
- selecting one of the optical carrier signal portions for onward transmission;
- modulating each one of other optical carrier signal portions with a respective modulated radio frequency subcarrier signal of the plurality of modulated radio frequency subcarrier signals and suppressing onward transmission of each of said other optical carrier signal portions, to form a plurality of carrier suppressed optical subcarrier signals each having a respective optical frequency, different from the carrier optical frequency;
- combining the selected optical carrier signal portion and the carrier suppressed optical subcarrier signals to form a subcarrier multiplexed optical signal; and
- controlling the carrier suppressed optical subcarrier signals and the selected optical carrier signal portion to each have a same polarization state when they are combined.

* * * * *